United States Patent [19]
Childs

[11] 3,736,431
[45] May 29, 1973

[54] SYSTEM FOR MONITORING A FLUID STREAM

[75] Inventor: Elbert B. Childs, Hastings-on-Hudson, N.Y.

[73] Assignee: Mobil Oil Corporation, New York, N.Y.

[22] Filed: Apr. 30, 1971

[21] Appl. No.: 139,121

[52] U.S. Cl.............250/205, 250/218, 250/220 C, 340/227 R, 356/208
[51] Int. Cl.......G01n 21/26, G08b 21/00, G01j 1/32
[58] Field of Search.................356/103, 207, 208; 250/218, 220 C, 205; 340/227

[56] References Cited

UNITED STATES PATENTS

| | | | |
|---|---|---|---|
| 3,561,875 | 2/1971 | Ried, Jr. et al. | 250/218 X |
| 1,940,772 | 12/1933 | Schoenberg | 356/70 |
| 3,437,822 | 4/1969 | Fitzsimmons | 250/218 |
| 3,462,608 | 8/1969 | Weston et al. | 250/218 |

*Primary Examiner*—James W. Lawrence
*Assistant Examiner*—T. N. Grigsby
*Attorney*—Oswald G. Hayes, Andrew L. Gaboriault and James F. Powers, Jr.

[57] ABSTRACT

The specific disclosure provides a device which includes a circuit having a pair of phototransistors. One of the phototransistors senses the amount of light transmission from a light source through an oil chamber. The other phototransistor is in direct optical communication with the light source, and generates a signal in response to ambient temperature which is used as a basis for adjusting the intensity of light emitted by the light source. A diminution of light transmission through the chamber is indicative of a degradation of the oil therein.

7 Claims, 6 Drawing Figures

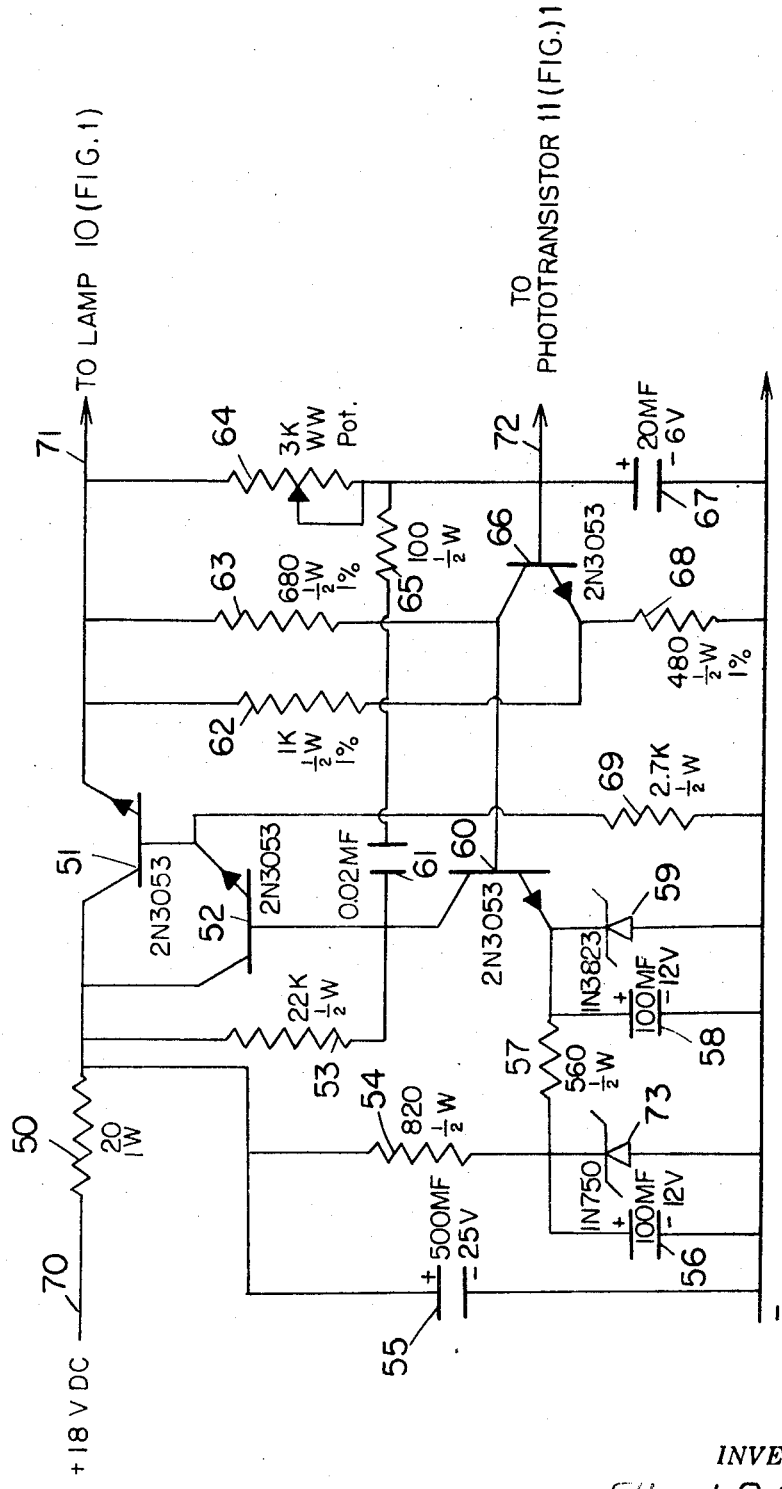

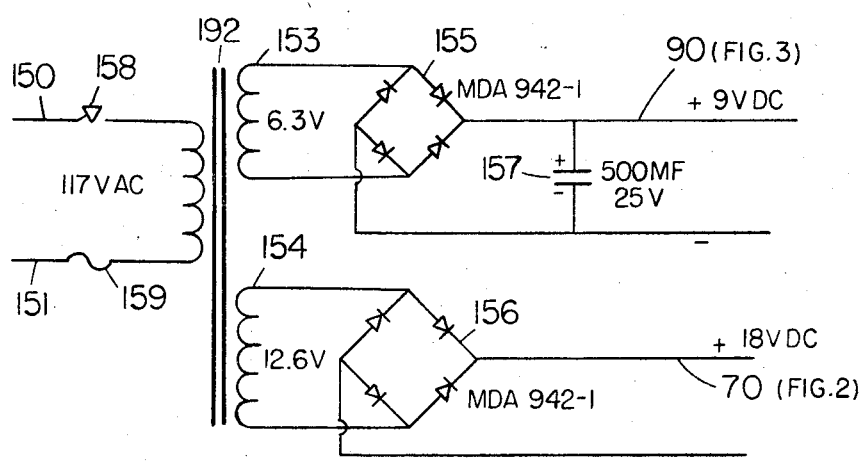
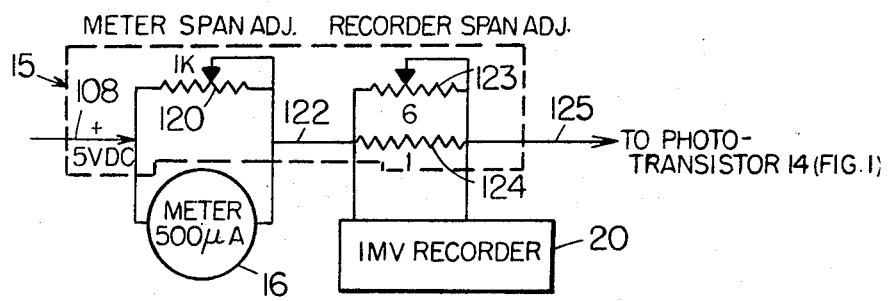
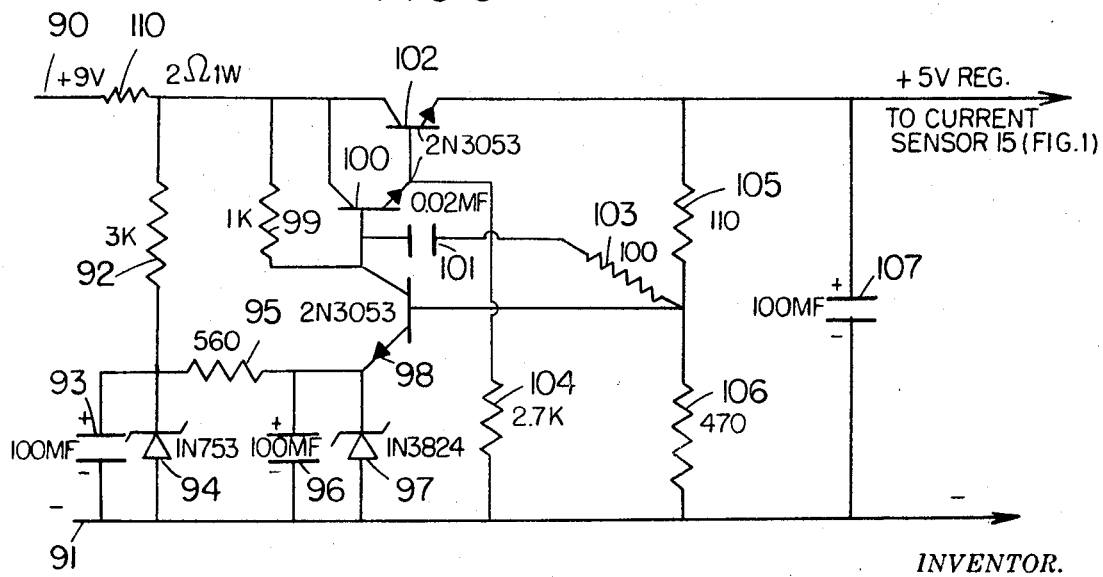
INVENTOR.
Elbert B. Childs

SYSTEM FOR MONITORING A FLUID STREAM

BACKGROUND OF THE INVENTION

1. Field of the Invention

The present invention is directed to a method and an apparatus for determining light absorption characteristics of a fluid. More particularly, the present invention is directed to a method and an apparatus for monitoring light absorption characteristics of a fluid stream.

2. Description of the Prior Art

U.S. Pat. No. 3,578,865, to issue on May 18, 1971, is assigned to the assignee of the present application and discloses a device for photoelectrically monitoring the degradation of an oil stream. The device of this patent includes a bridge circuit having a pair of photocells. One of the photocells senses the intensity of light transmission from a first light source through an oil chamber. The other photocell senses light transmission from a second light source and is located in close proximity to the first photocell to compensate for changes in ambient temperature. The diminution of light transmission through the chamber is indicative of a degradation of the oil therein, and is reflected by an unbalance in the bridge circuit.

SUMMARY OF THE INVENTION

In accordance with the present invention, there is provided a method of determining light absorption characteristics of a fluid such as oil comprising supplying the fluid to a chamber having a pair of opposing sides transparent to light. Light from a light source is applied to one of the transparent sides, and a signal indicative of the intensity of light passing through the chamber and the other of the transparent sides is generated and displayed as an indication of the light absorption characteristics of the fluid. The method also provides for compensating for changes in ambient temperature by adjusting the intensity of light generated by the light source.

In accordance with another aspect of the invention, there is provided an apparatus for determining light absorption characteristics of a fluid comprising a chamber having a pair of opposing sides transparent to light, and means for supplying the fluid to the chamber. A source of light is in optical communication with one of the transparent sides, and a first photoelectric means is in optical communication with the other of the transparent sides for generating a signal indicative of the intensity of light passing through the chamber. The apparatus further includes means responsive to the light signal for displaying a representation of the light signal. Further, the apparatus comprises second photoelectric means in direct optical communication with light from the source of light and responsive to ambient temperature at the first photoelectric means for generating a light intensity signal, and means responsive to the light intensity signal for adjusting the intensity of light generated by the source of light to compensate for changes in ambient temperature.

BRIEF DESCRIPTION OF DRAWINGS

FIGS. 2–5 show specific circuits for performing the functions of the blocks of FIG. 1.

DESCRIPTION OF SPECIFIC EMBODIMENTS

Figure 1:
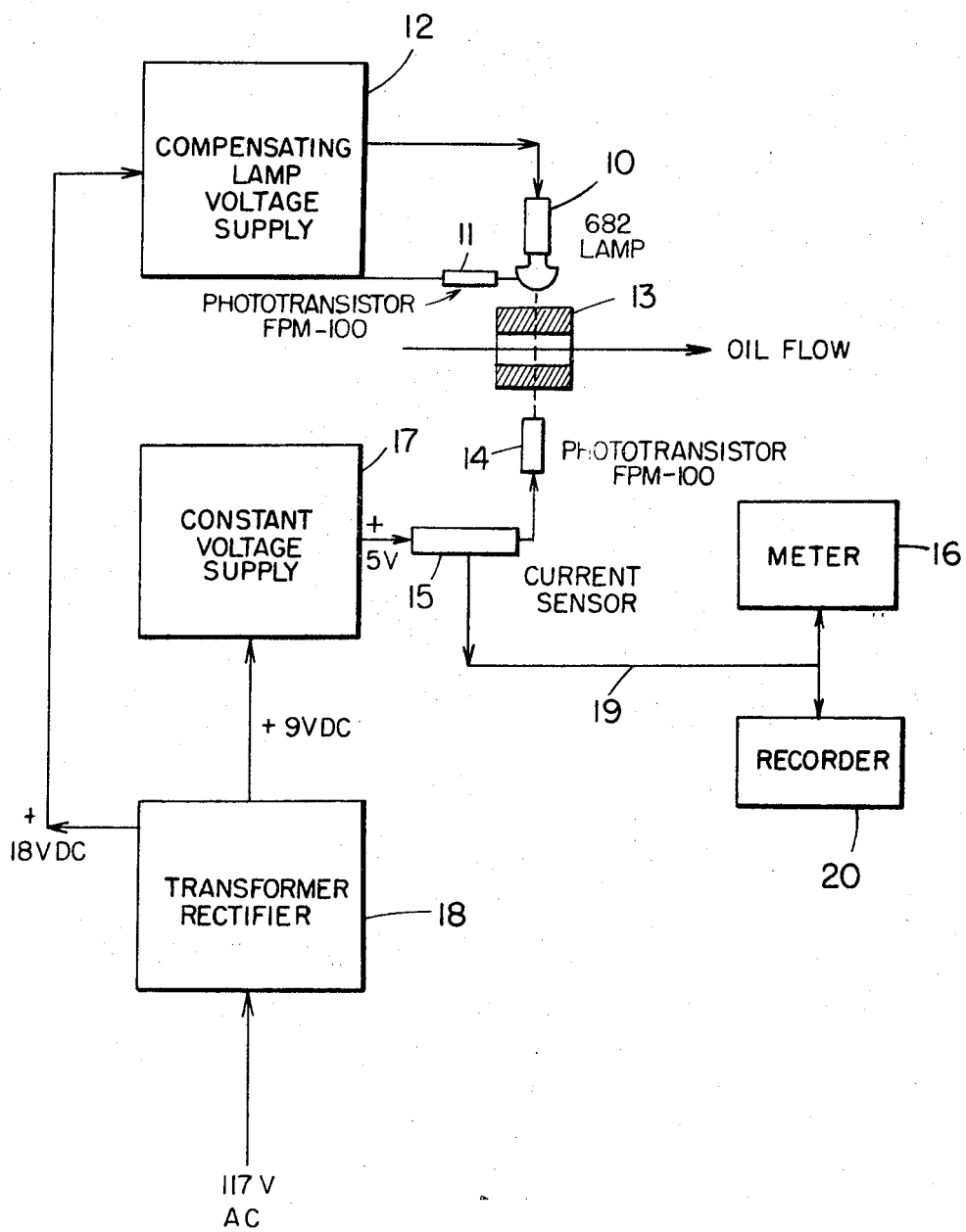
FIG. 1 shows in block diagram form a specific embodiment of the present invention.

FIG. 1 shows a specific embodiment of the present invention in block diagram form. With reference to FIG. 1, oil continuously flows through a cell 13 in the direction shown by the arrow. A source of light, such as a lamp 10, and a photoelectric device, such as a phototransistor 14, are situated on opposing sides of the cell 13. The electrical current through the phototransistor 14 is proportional to the amount of light transmitted through the oil in the cell 13, and thus is indicative of the condition of the oil. For example, the apparatus can be used to monitor a lubricating oil stream, and as the oil in the cell 13 darkens due to degradation, the degradation will be indicated by a decreased signal generated by the phototransistor 14.

The sensitivity of phototransistors is dependent upon temperature. For example, a Fairchild FPM-100 transistor is 5–6 times as sensitive to the same intensity of light at 300°F. as it is at room temperature of about 77°F. Thus, the signal output from the phototransistor 14 will rise as the temperature rises although the phototransistor 14 is sensing the same intensity of light. To compensate for changes in ambient temperature, a second phototransistor 11 is situated to directly monitor the intensity of light generated by the lamp 10. The second phototransistor 11 is connected to a compensating lamp voltage supply 12. The compensating lamp voltage supply 12 acts in response to the output from the second phototransistor 11 to control current flow to the lamp 10. Specifically, if the current output of the second phototransistor 11 increases due to an increase in ambient temperature, the compensating lamp voltage supply 12 decreases current flow to the lamp 10 to compensate for the increase in ambient temperature. Conversely, a decrease in ambient temperature causes the second phototransistor 11 to generate a lower output signal which, in turn, causes the compensating lamp voltage supply 12 to increase the current supplied to the lamp 10 and thereby increase the intensity of light generated by the lamp 10. Thus, the signal generated by the phototransistor 14 remains essentially constant with a given oil condition regardless of changes in ambient temperature about the cell 13.

A constant voltage supply 17 supplies a constant source of voltage to a current sensor 15. The current sensor 15 is connected to sense the amount of current flowing through the phototransistor 14 which is indicative of the intensity of light sensed by the phototransistor 14. The current sensor 15 applies a signal indicative of the current flowing through the phototransistor 14 to a line 19 which is connected to a meter 16 and a recorder 20.

The system can be used to monitor a lubricating oil stream, for example, to an aircraft engine. When used in an aircraft, the cell 13 can be situated under an engine cowling either at an input or an output of the engine to monitor changes in the lubricating oil during flight. The meter 16 can be situated in the cockpit to provide the crew with an analog display of the lubricating oil condition. The recorder 20 can be also situated remotely from the cell 13 to trend log changes in the lubricating oil condition during flight.

A transformer rectifier 18 is connected at its input end to an A.C. voltage power source, and generates suitable D.C. voltages for the compensating lamp voltage supply 12 and for the constant voltage supply 17.

Alternatively, the voltage supply source for the compensating lamp voltage supply 12 and for the constant voltage supply 17 can be from a typical D.C. power supply of an aircraft.

A circuit suitable to carry out the function of the lamp voltage supply 12 is shown in FIG. 2. With reference to FIG. 2, the transformer rectifier 18 (FIG. 1) applies a suitable D.C. voltage by a line 70 to a load dropping resistor 50. A line 71 connects the circuit of FIG. 2 to the lamp 10 (FIG. 1), and a line 72 connects the circuit of FIG. 2 to the phototransistor 11 (FIG. 1).

A capacitor 55 is provided to smooth the voltage applied to a voltage regulating circuit including resistors 54, 57, capacitors 56, 58, and zener diodes 73, 59. The cathode of the zener diode 59 acts to provide a relatively constant voltage to the emitter of a transistor 60 to provide a stable reference voltage. The base of a transistor 66 is connected by the line 72 to the phototransistor 11 (FIG. 1), and the collector of the transistor 66 is connected to a resistor 63 and the base of the transistor 60. The transistor 66 acts to control the voltage applied to the base of the transistor 60. Specifically, as the voltage resistance of the phototransistor 11 decreases due to an increase in ambient temperature, the voltage applied to the base of the transistor 66 is decreased, thus tending to turn off the transistor 66. When the transistor 66 tends to turn off the voltage on the collector of the transistor 66 and the base of the transistor 60 increases. An increase in the voltage applied to the base of the transistor 60 causes a decrease in the voltage at the collector of the transistor 60 as a result of an increase in current flow through a resistor 53.

A decrease in voltage at the collector of the transistor 60 is also reflected as a decrease in voltage at the base of a transistor 52 which in combination with a transistor 51 forms a compound series pass transistor circuit. When the voltage at the base of the transistor 52 decreases, the intrinsic resistance of the compound series pass transistor circuit increases to thereby decrease the voltage applied by the line 71 to the lamp 10. (FIG. 1). A decrease in the voltage applied to the lamp 10 (FIG. 1) causes a decrease in the light intensity of the lamp 10 to thereby compensate for a decrease in resistance of the phototransistor 11 (FIG. 1) caused by an increase in ambient temperature.

Conversely, an increase in the resistance of the phototransistor 11 (FIG. 1) due to a decrease in ambient temperature increases the voltage applied to the base of the transistor 60, which in turn causes a decrease in the voltage applied to the base of the transistor 60. A decrease in the voltage applied to the base of the transistor 60 increases the voltage at the base of the transistor 52 to thus decrease the intrinsic resistance of the compound series pass transistor circuit including the transistors 51, 52. The decrease in the intrinsic resistance of the series pass transistor circuit acts to increase the voltage applied to the lamp 10 (FIG. 1) by the line 71. An increase in the voltage applied to the lamp 10 increases the light intensity of the lamp 10 to compensate for the increase in resistance of the phototransistor 11 due to the decrease in ambient temperature.

A capacitor 67 is provided in the circuit to dampen the response from the phototransistor 11 to thus compensate for transient excursions in the output of the phototransistor 11. A capacitor 61 and a resistor 65 is provided in a circuit to prevent parasitic oscillation in the circuit.

A voltage divider network including resistors 62, 68 is connected between the line 71 and ground. The emitter of the transistor 66 is connected between the resistors 62, 68. The resistors 62, 68 are provided in the circuit to compensate for the non-linear response curve of the phototransistor 11 with change in temperature for a given sample.

A variable resistor 64 is provided in the circuit as a means of calibrating or fixing a set point for the compensating lamp voltage supply circuit shown in FIG. 2.

A resistor 69 is also provided in the circuit of FIG. 2 to insure that current flows through the base of the transistor 51 even though it is operated at a point near cutoff to thus prevent a loss in control of the voltage applied to the line 71.

A circuit suitable for carrying out the function of the constant voltage supply 17 (FIG. 1) is shown in FIG. 3. With reference to FIG. 3, the output from the transformer rectifier 18 (FIG. 1) is applied to lines 90, 91 to a load dropping resistor 110. A regulating or reference generating circuit including resistors 92, 95, capacitors 93, 96, and zener diodes 94, 97 to provide a relatively stable reference voltage to the emitter of a transistor 98. The base of the transistor 98 senses the voltage between a pair of resistors 105, 106. If the voltage between the resistors 105, 106 decreases, the voltage generated at the collector of the transistor 98 increases due to a decrease in the current flow through a resistor 99. The increase in voltage at the collector of the transistor 98 is also reflected at the base of a transistor 100 which in combination with a transistor 102 forms a compound series pass transistor circuit. When the voltage at the base of transistor 100 increases, the intrinsic resistance of the compound series pass transistor circuit decreases to thereby increase the voltage applied on the line 108.

Conversely, when the voltage applied to the base of the transistor 98 increases, the voltage developed at the base of the transistor 100 decreases to cause an increase in the intrinsic resistance of the compound series pass transistor circuit and thereby decrease the voltage applied on the line 108.

A capacitor 101 and a resistor 103 are provided in the circuit to suppress parasitic oscillations in the circuit. A capacitor 107 is also provided in the circuit to smooth the output voltage on line 108 which is connected to the current sensor 15 (FIG. 1). A resistor 104 is provided in the circuit to insure that current flows through the base of the transistor 102 even though the transistor 102 is operated near its cutoff point and thus insure that there is no loss in control of the voltage generated on the line 108.

FIG. 4 shows a circuit arrangement suitable for carrying out the function of the current sensor 15 of FIG. 1. With reference to FIG. 4, the line 108 which corresponds to the line 108 of FIG. 3 applies a regulated voltage to a variable resistor 120. The variable resistor 120 is connected by a line 122 to a parallelly arranged variable resistor 123 and a resistor 124. The variable resistor 123 and the resistor 124 are connected by a line 125 to the phototransistor 14 (FIG. 1). The meter 16 (FIG. 1) is connected in parallel with the variable resistor 120, and the recorder 20 (FIG. 1) is connected in parallel with the variable resistors 123 and the resistor 124. The variable resistors 120 and 123 are adjustable to control the span of the meter 16 and the recorder 20, respectively. The voltages developed across the variable resistor 120 and the resistor 124 are proportional to the level of current flowing through the phototransistor 14. Thus, as the current flowing through the phototransistor 14 increases due to an increase in the intensity of light sensed by the phototransistor 14, the amount of current flowing through the variable resistor 120 and the resistor 124 will increase and develop higher voltages across these resistors. Conversely, as the amount of current flowing through the phototransistor 14 decreases due to a decrease in the light intensity sensed by the phototransistor 14, the amount of current flowing through the variable transistor 120 and the resistor 124 will decrease to thereby develop lower voltages across the resistors.

The voltages developed across the variable resistor 120 and the resistor 124 are read out and displayed by the meter 16 and the recorder 20, respectively, to provide a representation of the light absorption characteristics of the oil in the cell 13 (FIG. 1).

FIG. 5 shows a circuit suitable for carrying out the function of the transformer rectifier 18 (FIG. 1). With reference to FIG. 5, lines 150, 151 connect an A.C. power supply (not shown) to a transformer 152 through a switch 158 and a fuse 159. One coil 153 of the secondary of the transformer 152 is connected to a full wave rectifier 155. The full wave rectifier applies a suitable D.C. voltage by the line 90 to the input of the constant voltage supply circuit shown in FIG. 3. A capacitor 157 is connected between the line 90 and ground to smooth out transient variations in the output developed on the line 90.

Another coil 154 in the secondary of the transformer 152 is connected to a full wave rectifier 156. The full wave rectifier 156 develops a suitable D.C. voltage on the line 70 for application as an input to the compensating lamp voltage supply circuit shown in FIG. 2.

Figure 6:
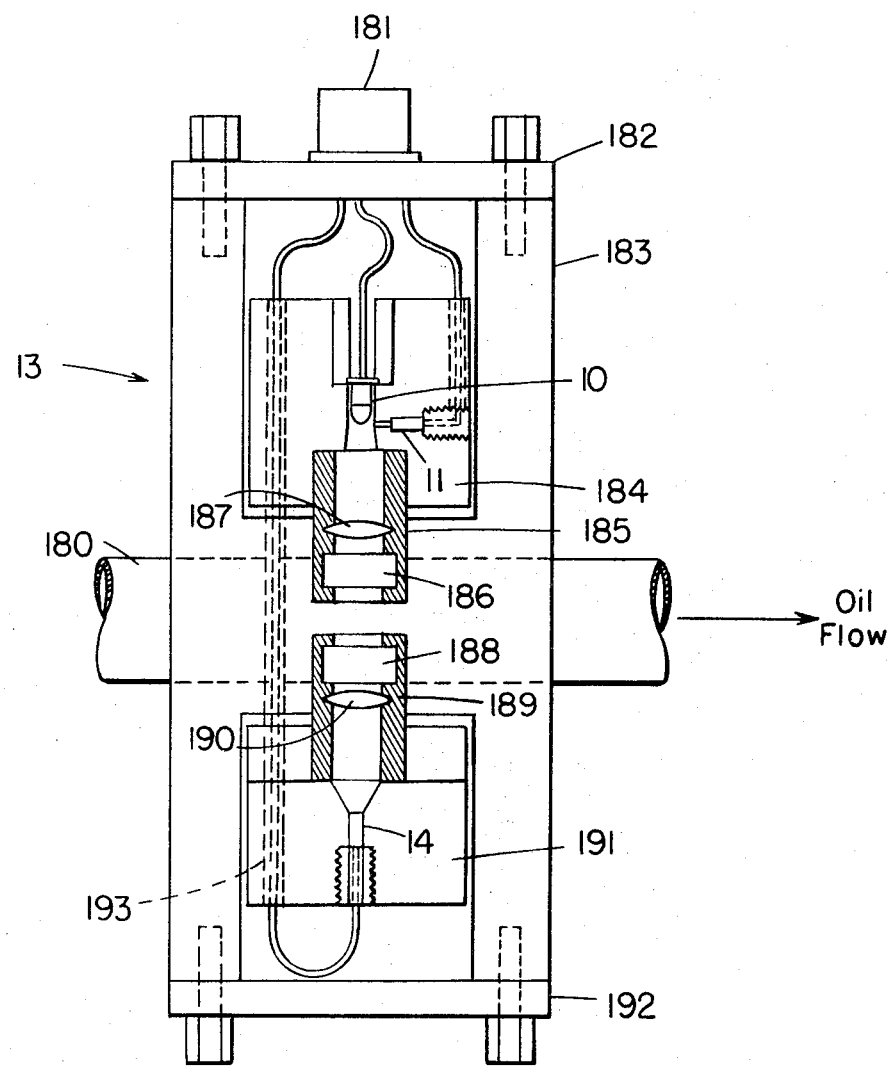
FIG. 6 shows a cell assembly suitable for use in a specific embodiment of the invention.

A suitable cell and optical arrangement for the lamp 10, phototransistors 11, 14 and cell 13 of FIG. 1 is shown in FIG. 6. With reference to FIG. 6, the cell 13 includes a body portion 183 having a bore formed therein to permit the flow of oil in the direction indicated by the arrow through a conduit 180. Headers 182, 192 are secured to opposing ends of the body 183. A hermetically sealed connector 181 is affixed to the top header 182. The connector 181 has connecting lines (not shown) leading to the circuits of FIGS. 2–4. A holder 184 is shown in cross section and is positioned in a cut out portion of the body 183. The holder 184 contains the lamp 10 (FIG. 1) and the phototransistor 11 (FIG. 1).

An optical holder 185 is shown in cross section and is fixedly secured at its upper end to the holder 184. The optical holder 185 positions an optical lens 187 and an optical flat 186 between the lamp 10 and oil flowing through the conduit 180.

A holder 191 is shown in cross section and is positioned in a cut out portion at the lower end of the body 183. The holder 191 has therein the phototransistor 14 (FIG. 1) which is in optical communication with oil flowing through the conduit 180 through an optical lens 190 and an optical flat 188. The optical lens 190 and the optical flat 188 are secured to an optical holder 189 shown in cross section.

A bore 193 extends through the holder 191, the body 183 in back of the oil flow in the conduit 180, and the holder 184 to provide means for directing the electrical connections between the connector 181 and the phototransistor 14.

Thus, the optical flats 186, 188 in combination with the holders 185, 189 and the conduit 180 within the body 183 form a chamber through which the oil flows. Further, the optical flats 186, 188 provide opposing sides of the chamber which are transparent to light emanating from the lamp 10.

The conduit 180 can be a main oil stream or can be a side sampling stream from a main oil stream.

The lamp 10 and the phototransistors 10, 14 can each be at a location remote from the oil stream in the body 183 and in optical communication with the oil stream in the body 183 by optical fibers.

FIGS. 1–5 show thereon suitable voltage levels and circuit components for constructing a specific embodiment. The numerals near each resistor and capacitor without lead lines indicate resistance in ohms and capacitance in microfarads, respectively. The optical lenses 187, 190 and the optical flats 186, 188 can be composed of quartz.

It is preferable that the phototransistors 11, 14 and the lamp 10 of FIG. 6 are arranged that each of the phototransistors 11, 14 generate approximately the same current for a given light intensity generated by the lamp 10 when air is in the chamber formed between the transparent flats 186, 188.

A specific embodiment constructed in accordance with the foregoing was placed under a 1,000 hour dynamic test having a jet lubricating oil fed thereto at 200 ± 10°F., 45–50 psi at a throughput of 1.5 to 2 gpm. A continuous monitoring of the test showed less than 1 percent change in reading at 190°F. throughout the 1,000 hour period. The change in reading when cooling to room temperature was approximately 2–3 percent.

Other photoelectric devices, such as photocells, may be used in place of the phototransistors 11, 14.

As light intensity varies, there is a change in light wavelength. If this becomes a problem during a particular use of the apparatus, filters can be inserted in front of each of the two phototransistors.

A go-no go sensor may be included in the apparatus described hereinabove to sound an alarm if the oil quality falls below a predetermined set point.

As described hereinabove, the invention may be applied to monitor the degradation indicated by a change in the relative darkness of a lubricating oil supplied to an engine, e.g. an aircraft engine. Other exemplary usages of the invention are to provide a determination or monitoring of the percent of air mixed with oil in, for example a hydraulic system. If oil color did not change, the readings would vary with the amount of entrained air. The apparatus can also be used to determine the amount of a dark colored additive mixed with a light colored liquid. Further, pollution of a light colored liquid with a dark colored liquid or vice versa could also be measured.

What is claimed is:

1. A system for determining the light absorption characteristics of a fluid medium under varying temperature conditions which comprises:

means for passing a fluid stream through a confined chamber provided with opposing side means transparent to light, means for passing light of controlled intensity from a light source means through said transparent side means and the fluid stream therebetween, a first temperature sensitive non-linear phototransistor means provided on one side of said chamber and a second temperature sensitive non-linear phototransistor means provided on the opposite side of said chamber in line with the transparent sides thereof, said first and second temperature sensitive non-linear phototransistor influenced by temperature variations to the system in the same direction, said first non-linear phototransistor means used to measure light transmitted through said fluid stream from said light source, said first non-linear phototransistor means generating a signal from the light transmitted through said fluid to indicate the light absorption characteristics of said fluid stream, means for adjusting the intensity of said light source through a signal generated by said second non-linear phototransistor means so that both phototransistors response to the intensity of the light source will remain the same irrespective of directional changes due to temperature influencing said phototransistors response to the light source intensity whereby temperature variations in the fluid medium and system does not undesirably influence determining the light absorption characteristics of the fluid medium.

2. The system of claim 1 wherein the signal generated by the first non-linear phototransistor means is converted for readout by a meter means which will warn of unacceptable fluid medium conditions.

3. The system of claim 1 wherein the signal generated by the first non-linear phototransistor means is converted for readout by a recorder means which will warn of unacceptable fluid medium conditions.

4. The system of claim 1 wherein the signal generated by the first non-linear phototransistor means is converted for readout by an alarm system arranged to warn of unacceptable fluid medium conditions.

5. The system of claim 1 wherein said opposing side means transparent to light comprise a combination of optical flats and lens means arranged to transmit parallel light rays through said fluid medium.

6. The system of claim 1 wherein filter means are provided between the light sensitive phototransistor means and said light source means to compensate for changes in light wavelength as the light intensity is varied.

7. The system of claim 1 relied upon to continuously monitor during in flight conditions the condition of a jet fuel supplied to an aircraft jet engine.

* * * * *